Oct. 9, 1928.
H. K. FAIRALL
1,686,907
FILM DEVELOPING MACHINE
Filed May 18, 1927    3 Sheets-Sheet 1
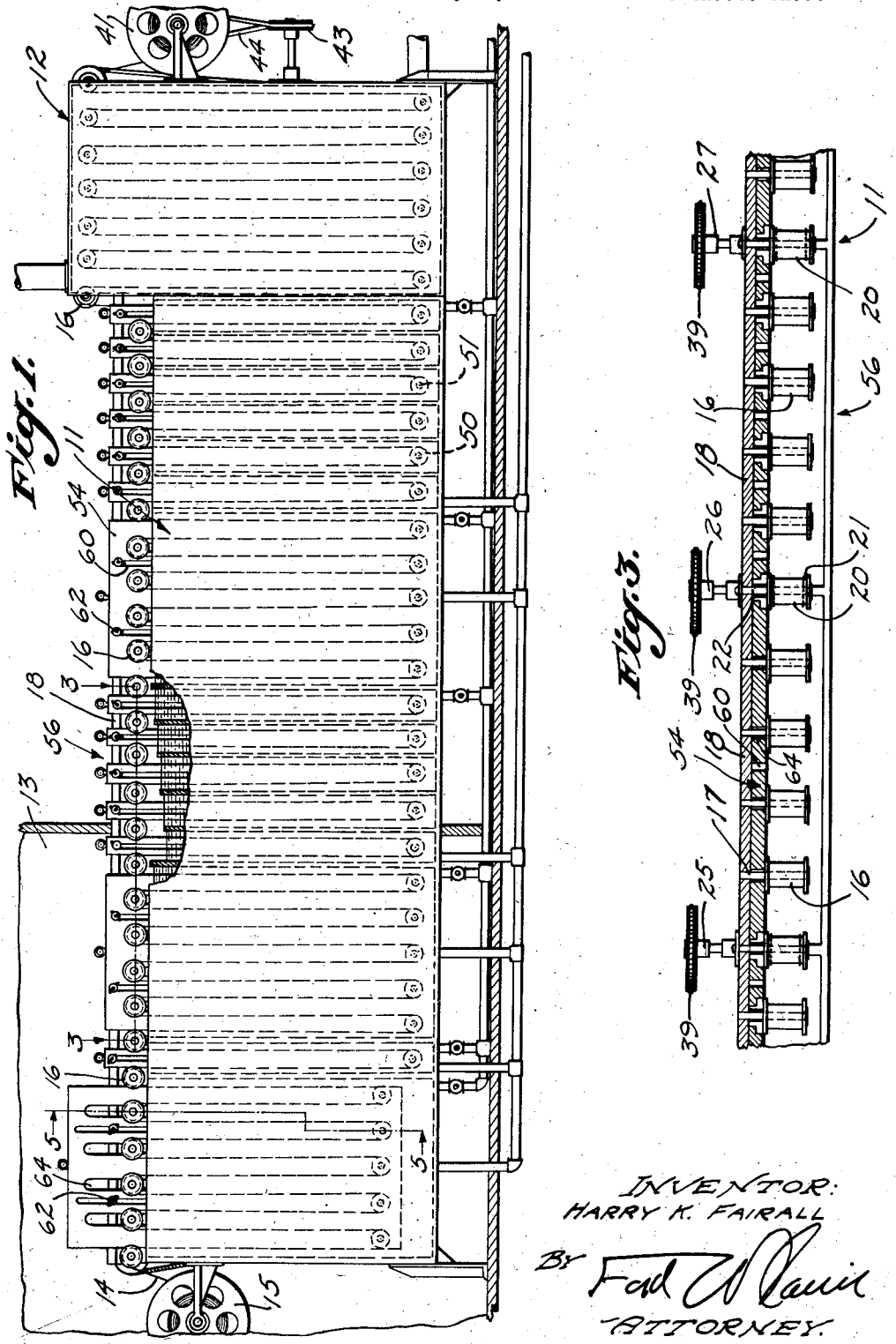
INVENTOR:
HARRY K. FAIRALL
By Fad W Davis
ATTORNEY.

Oct. 9, 1928.　　　　　　　　　　　　　　　　　　1,686,907
H. K. FAIRALL
FILM DEVELOPING MACHINE
Filed May 18, 1927　　　3 Sheets-Sheet 2
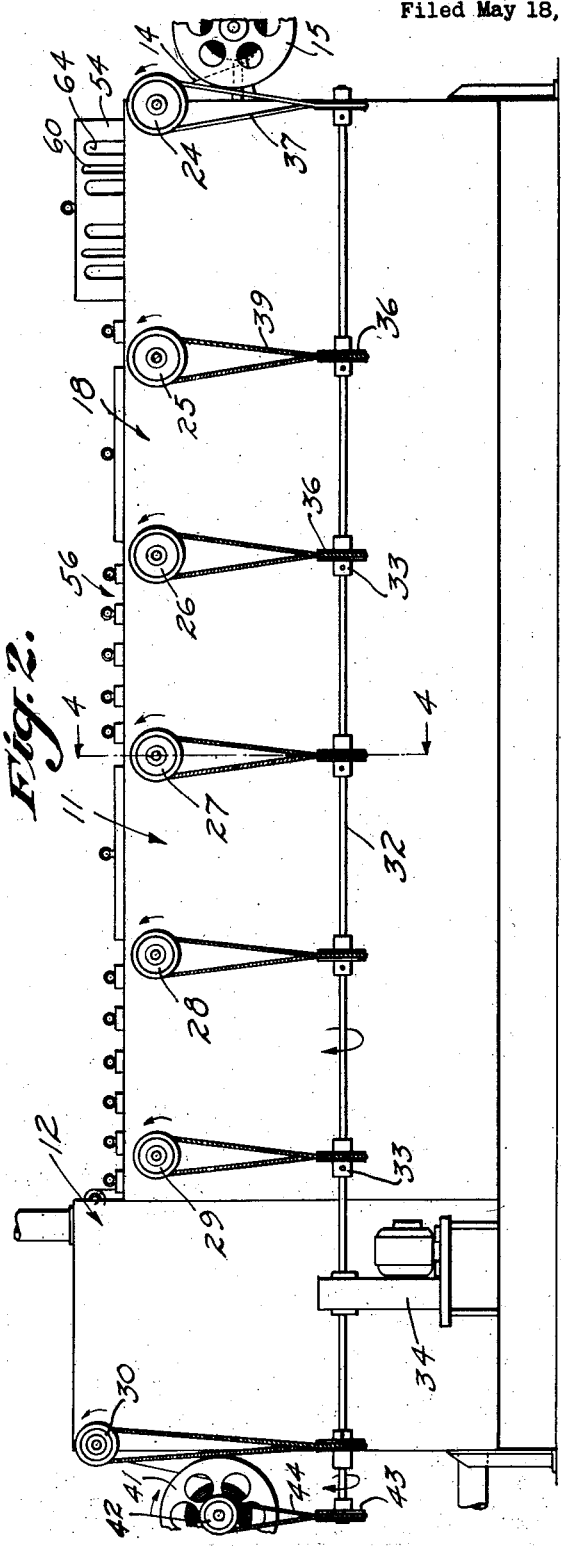
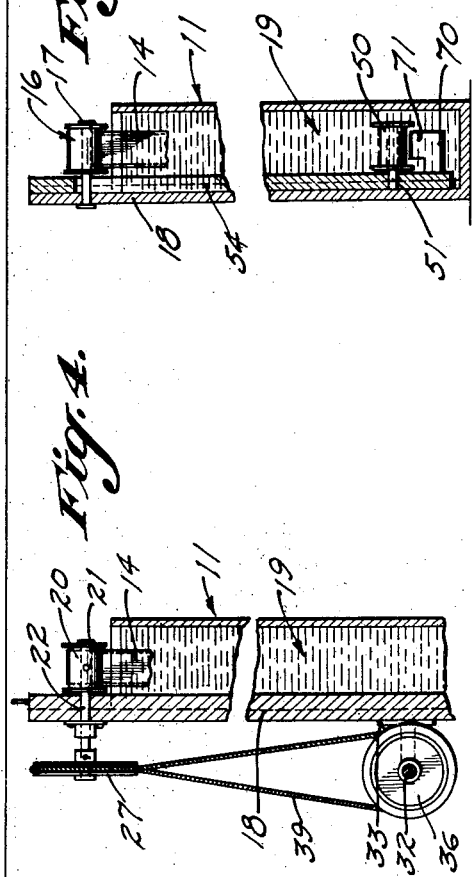
INVENTOR:
HARRY K. FAIRALL
ATTORNEY.

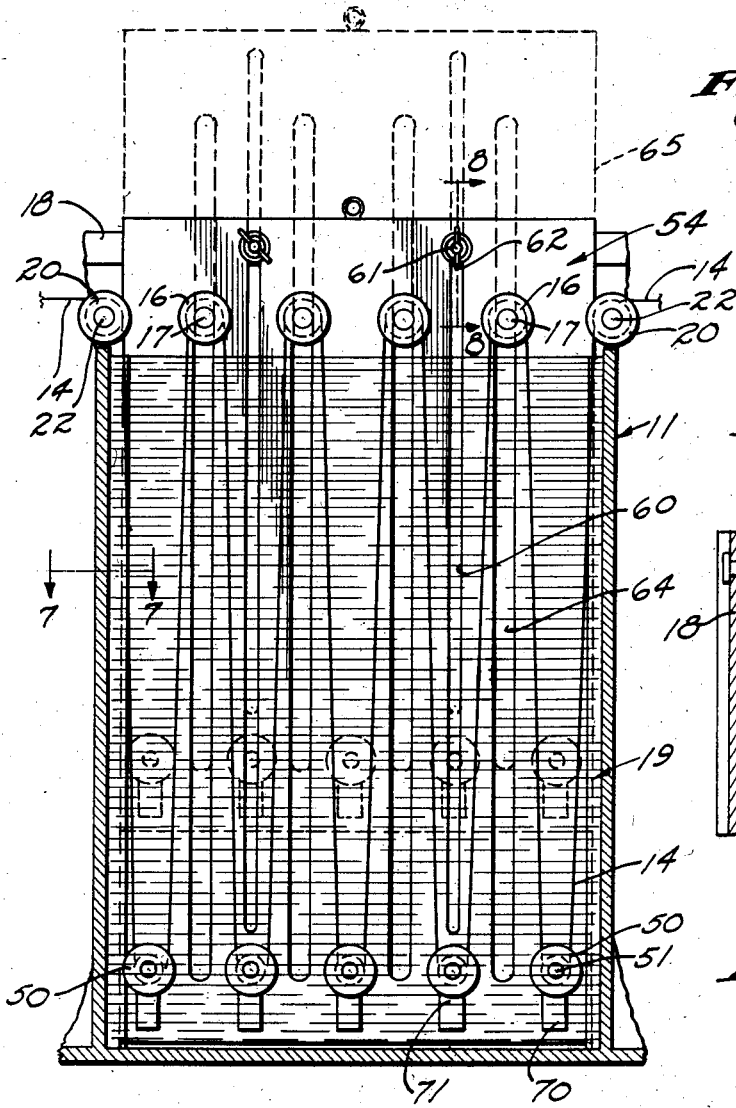
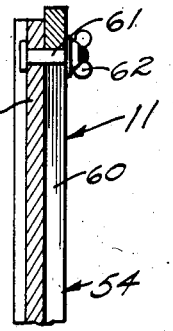
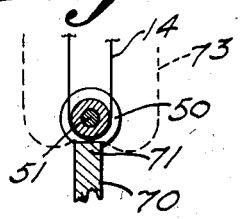
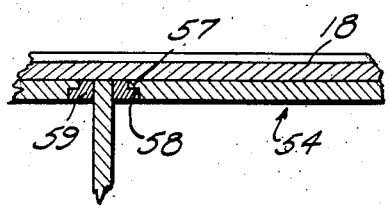

Patented Oct. 9, 1928.

1,686,907

UNITED STATES PATENT OFFICE.

HARRY K. FAIRALL, OF LOS ANGELES, CALIFORNIA, ASSIGNOR TO BINOCULAR STEREO-SCOPIC FILM COMPANY, OF LOS ANGELES, CALIFORNIA, A CORPORATION OF CALIFORNIA.

FILM-DEVELOPING MACHINE.

Application filed May 18, 1927. Serial No. 192,311.

This invention relates to the art of developing photographic film, and it is embodied in an automatic film developing machine especially suitable for developing motion picture film.

In this art both positive and negative films, after their exposures, are subjected to series of treatments which prepare them for the cutting room. The exposed film generally passes through the following steps. The film is first developed by immersion in a developing solution; the images are then fixed thereon by immersion in a fixative solution; the film is then cleansed of all adhering solutions by immersion in a wash; the film may then be dyed or toned as desired; and it is then dried.

Motion picture films are carried through these series of treatments either manually or by automatic apparatus, and my invention relates to an automatic apparatus for carrying the film through the series of treatments just enumerated.

In the ordinary film developing machine the film is passed through the film solution tanks or "wet box" and the drying compartments or "dry box", the wet and dry boxes having series of upper and lower spools of rollers on which the film is wound. The film stretches while it is in the wet box and shrinks while in the dry box. The most urgent problem to combat in such an apparatus is that which results from the stretch and shrinkage of the film. If the film becomes too loose on the spools there is danger of it being tangled, and if it becomes too tight there is danger of it being distorted and broken.

It is an object of this invention to provide a film developing apparatus in which the tension of the film is automatically maintained at normal tension. "Normal tension" should be understood to mean that tension at which there is a minimum of strain on the film but yet no looseness which might result in tangling.

Since all film is not exposed under the same light conditions it is necessary that different portions of the film shall be developed more or less in order to obtain proper images. In the ordinary film developing apparatus, when the film must be developed more than the average, the developing machine is run slower, and when the film must be developed less than the average, the developing machine is run faster. When using this method of changing the developing period it will be seen that the other treatment periods are also changed.

It is an object of this invention to provide a film developing apparatus in which any of the treatment periods may be varied without changing the others, and without speeding up or slowing down the film developing apparatus as a whole.

A still further object of my invention is to provide a film developing apparatus in which the film, if it becomes slack, cannot fall from the lower rollers and become tangled.

Other objects and advantages of the invention will be made evident in the following description.

Referring to the drawings in which I illustrate a preferred form of my invention.

Fig. 1 is a front elevational view of an apparatus embodying the features of this invention.

Fig. 2 is a back view taken substantially in an opposite direction from Fig. 1.

Fig. 3 is a fragmentary section taken on the line 3—3 of Fig. 1.

Fig. 4 is a fragmentary section taken on the line 4—4 of Fig. 2.

Fig. 5 is a fragmentary section taken as indicated by the line 5—5 of Fig. 1.

Fig. 6 is an enlarged fragmentary view showing the interior of a portion of the film developing apparatus and the means for and manner of changing the period of treatment of the film at any place in the apparatus.

Fig. 7 is a section taken on the line 7—7 of Fig. 6.

Fig. 8 is a fragmentary section taken as indicated by the line 8—8 of Fig. 6.

Fig. 9 is a fragmentary diagrammatic view illustrating the means of and the manner in which the film is prevented from falling from the lower rollers when it is slack.

Referring to the drawings and particularly Figs. 1 and 2, the numeral 11 represents a wet box, and the numeral 12 represents a dry box of the film developing apparatus. This construction is according to standard constructions and need not be explained in detail. The left end of the wet box 11 extends into a dark room 13. A film 14 to be developed is supported on a reel 15 in the dark room 13. The wet and dry boxes are provided with upper driven rollers 16 which are free to rotate on shafts 17. The shafts 17 are supported either by the housing of the dry box or, in the wet box, by a wall 18. The upper driven rollers 16 of the wet box are above the upper parts of tanks 19 which form a part of the wet box 11. Placed at intervals along the apparatus are drive rollers 20. The drive rollers 20 are typically illustrated in Fig. 4, which is a section taken through the wet box 11. The drive rollers 20 are in the shape of spools but have teeth 21 which extend through perforations of the film 14 so that a positive drive may be obtained. The drive rollers 20 are rigidly secured on shafts 22 which are either supported by the wall 18 of the wet box or by a wall of the dry box 12. The ends of the shafts 22 extend to the rear of the apparatus, and as shown in Fig. 2 have driven pulleys 24, 25, 26, 27, 28, 29 and 30 secured thereto. Extending horizontally in back of the wet and dry boxes is a drive shaft 32 which forms a part of the drive unit of the invention. The drive shaft 32 is suitably supported by bearings 33 and is driven by means of a motor drive arrangement 34. The drive shaft 32 carries a series of drive pulleys 36, one of which is placed directly below each of the pulleys 24 to 30 inclusive and is adapted to drive it by means of suitable belts. The drive pulley 24 which is at the forward end of the film developing apparatus where the film leaves the feed reel is driven by one of the drive rollers 36 by means of a positive drive belt 37. The positive drive belt 37 is adapted to drive the driven roller 24 at a uniform rate of speed at all times. This belt 37 may be made of leather or other similar material which will not slip on either the driven or drive pulleys. The other driven pulleys 25 to 30 inclusive are frictionally driven from the other drive pulleys 36 by means of spring belts 39 which, if there is sufficient opposition to the turning of the driven rollers, will permit a slippage. The ratios between the different pairs of drive and driven pulleys are such that the drive roller operated by the driven pully 24 which is at the forward part of the machine travels the slowest; the others of the drive rollers are progressively driven faster as the rear end of the apparatus is approached. This is easily done as shown in the drawings by uniformly making the driven pulleys 24 to 30 inclusive progressively smaller, the driven pulley 24 being the largest and the driven pulley 30 of this series being the smallest.

At the exhaust end of the apparatus is a receiving reel 41 on which the film is wound after it passes from the dry box 12. The receiving reel 41 is driven by means of a driven pulley 42 which is operated by a drive pulley 43 through a belt 44 which frictionally drives the driven pulley 42. The driven pulley 42 is slightly smaller than the driven pulley 30, whereas the drive pulley 43 is of the same size as the drive pulleys 36; therefore the receiving reel 41 will be driven at a higher rate of speed than the drive roller which is driven by the driven pulley 30.

Placed below the drive rollers and the upper driven rollers 16 in an offset relationship, as illustrated best in Figs. 1 and 6, are lower driven rollers 50. The driven rollers 50 are rotatably supported on shafts 51. In the dry box 12 the shaft 51 are secured to a wall thereof and are stationary. In the wet box, however, the shafts 51 are attached to vertical slide members 54 which rest in contact with the back wall 18 of the wet box 11. Referring to Figs. 1 and 6 it will be seen that the slide members 54 may be wide enough to carry a plurality of shafts 51 and lower driven rollers 50 or, as illustrated at 56 in Fig. 1, only wide enough to carry a single shaft and roller 51 and 50. As illustrated best in Fig. 7, the edges of the slide members 54 are provided with tongues 57 which extend into vertical channels 58 provided by guide members 59 which extend vertically along the back wall 18. This arrangement permits the slide members to slide vertically but prevents them from being moved horizontally from proper position. The slide members 54 are provided with a slot or a pair of slots 60 through which (Fig. 8) a clamp bolt 61 extends. The clamp bolt 61 is supported by the back wall 18 at the upper end thereof and has a winged nut 62 screwed onto the end thereof so that the slide member 54 may be pressed against the adjacent face of the back wall 18 and thus be frictionally held in place. The slide members 54 are also provided with a slot or a plurality of slots 64 which extend vertically and through which the shafts 17 and 22 extend. The slide members 54, as typically illustrated in Fig. 6, may be shifted vertically from the position shown in full lines in this figure upward into other positions such as indicated by dotted lines 65.

The film 14 is wound around the drive rollers 20 and the upper and lower driven rollers 16 and 50 as illustrated best in Figs. 1 and 6. This film, as is evident, passes into the various treating tanks of the wet box 11 and from thence into the dry box 12 where it is dried, being finally wound on the receiving reel 41.

For the purpose of preventing the film from falling from the lower driven rollers 51 whenever it becomes slack, I provide a construction as illustrated best in Figs. 5, 6 and 9. Secured to one of the slide members 54 below each lower driven roller 50 is a holding means 70. The holding means 70 has an upward projecting portion 71 which extends between the edge flanges of the driven roller 50 thereabove, the edge flanges of the roller being quite long. Referring to Fig. 9 in particular, when the film 14 is at normal tension it fits around the lower driven rollers 50 as illustrated in Fig. 9; however, if the film should become slack it falls into the position indicated by dotted lines 73 of Fig. 9. The portion of the film immediately below the lower driven roller 50 engages the upper face of the upwardly extending projection 71 and is prevented from dropping below the edge flanges of the roller. When the film is again returned to normal tension, it will occupy a proper position as indicated by full lines. If it were not for the holding means 70, the portion of the film immediately below the roller would drop considerably below the edge flange thereof, and the loop of film might be moved sideward so that when the film was again returned to normal tension the lower part of the loop would not return to proper position between the edge flanges of the roller, but would catch on one of the flanges. This would result in damage to the film, probably tearing it and requiring the entire machine to be shut down. If it were necessary to shut down the machine, it is very evident that a part of the film would be ruined.

The operation of my invention is substantially as follows:

Ordinarily there is a leader in the apparatus at all times. By "leader" I mean a strip properly wound around the rollers to which the film to be developed is connected. This avoids the necessity of rethreading the machine on every operation of it. The leader is installed in the machine ordinarily by attaching it to the back end of a film which is being developed so that when the film being developed is passed from the machine the leader will be wound therein; however, when first starting up the machine the leader is wound around the various rollers while the slide members 54 are in an extreme raised position at which time the lower driven rollers 50 are resting in a plane adjacent to the upper part of the tanks 19. It is a comparatively simple matter to wind the rollers when the lower rollers are in this position.

The first drive roller 20 which is at the forward part of the film developing machine, as previously mentioned, is positively driven at a uniform rate of speed. The other of the drive rollers are frictionally driven. The first drive roller 20 controls the rate of speed at which the film passes through the film developing apparatus. The other drive rollers under ordinary conditions cannot move any faster than the first drive roller because they are frictionally driven by the spring belts 39. When the film is passing through the wet box it expands slightly. In order to compensate for this expansion I have provided the drive rollers, other than the first drive roller, with a drive means which is capable of driving the rollers at a higher rate of speed than the first drive roller in event that the opposition thereon is not too great; therefore, when the film tends to stretch, the resistance placed on the next drive roller is decreased so that it may be driven at a higher rate of speed, at this time there being less slippage of the spring belt 39. This momentary increase in rotation of the drive roller removes any slack from the film due to a stretching of it and maintains it at normal tension. All of the drive rollers other than the first one will operate in this manner whenever the film stretches. On the other hand, whenever the film shrinks such as occurs in the dry box, the drive roller immediately following the point at which the shrinkage occurs may rotate slower, this being possible by reason of a greater slippage of the spring belt. As the film is wrapped onto the receiving reel 41 the diameter of the reel becomes larger and consequently the rate of rotation gradually decreases. This decrease in rotation is permitted since a spring belt 44 is employed as a driving means between the driven and drive pulleys 42 and 43.

As pointed out heretofore, films are exposed under different conditions and therefore must be subjected to slightly different periods of treatment. In my invention it is possible to change the treatment in a developing tank or in the fixing tank independently of each other. This is accomplished by merely sliding the slide members 54 upward or downward. For example, referring to Fig. 6 as this figure shows the rollers in the developing tank, to decrease the amount of development of the film the slide member 54 may be moved upward from full line position into dotted line position 65. This shortens the lengths of the loops of the film and consequently shortens the time at which that part of the film remains in the developing tank.

When the slide member and the rollers carried thereby are moved upward, it will be evident that the loops of film will be quite slack until the drive rollers compensate for this slackness. Immediately after the slide member 54 is moved upward, the loops thereof may assume the position shown by dotted lines 73 in Fig. 9; however, this will not cause the lower parts of the loop to drop from the lower driven rollers 50 by reason of the holding means 70 which retains the lower parts of the loops between the edge flanges of the different lower driven rollers 51.

There are various important features of the invention, all of which have been thoroughly pointed out in the foregoing description. The first feature of great importance is the drive means for the drive rollers, which drive means automatically maintains the film at a certain tension, compensating for any stretch in the film and compensating for any shrinkage in the film. The rate at which the film is fed through the film developing apparatus is uniform and controlled by the first drive roller 20. The rate of feeding may be varied by changing the speed at which the drive shaft 32 is rotated. It is important to note that in the entire apparatus illustrated there are only eight drive rollers which are spaced at intervals throughout the apparatus. This, of course, lends simplicity to the apparatus, greatly reducing its initial cost and maintenance.

Another feature of the invention which is quite important is the construction which permits the period of treatment in any of the tanks to be changed without in any way modifying the period of treatments of the other tanks of the apparatus. This, as previously pointed out, is accomplished by mounting the lower driven rollers 50 so that their vertical positions in the tanks may be readily changed. This may be done without shutting down the apparatus. The value of such an arrangement is that in inspecting the film, it may be seen that a greater or less developing of the film should be had. If it were necessary to shut down the machine to change this, the film in the solution tanks would probably be injured by over-treatment. By this invention the film is kept in motion, the slide members 54 being elevated without any interference thereto.

A third feature of the invention is the construction for preventing the film from falling from the lower driven rollers 50 when it becomes slack. This is accomplished by a very simple means as illustrated in the drawings.

I have illustrated only a preferred form of the invention, and I understand that certain modifications may be made. For example, in the driving mechanism the different ratios between the drive and driven rollers may be accomplished by changing the diameters of the drive rollers rather than the driven rollers, or on the other hand, such a frictional driving and increase in speed of the different rollers as the exhaust end of the apparatus is approached may be accomplished by a slightly different apparatus. Instead of providing spring belts positive drive belts may be provided and clutches may be inserted between the drive roller and shafts on which they are mounted. Another modification may be made in the other parts of the invention. I believe that all such changes come within the scope of this invention, and therefore have written broad claims to protect me in measure with my invention.

I claim as my invention:

1. In a film developing apparatus, the combination of: driven rollers on which a film is carried; drive rollers arranged at intervals in said apparatus, said drive rollers being adapted to drive said film; and means for driving said drive rollers, said drive rollers being driven progressively faster as the backward end of said apparatus is approached, said drive means including a drive unit having a plurality of drive pulleys, a driven pulley drivably associated with said drive rollers, and belts whereby said drive pulleys operate said driven pulleys.

2. In a film developing apparatus, the combination of: driven rollers on which a film is carried; drive rollers arranged at intervals in said apparatus, said drive rollers being adapted to drive said film; and means for driving said drive rollers, said drive rollers being driven progressively faster as the backward end of said apparatus is approached, said drive means including a drive unit having a plurality of drive pulleys, a driven pulley drivably associated with said drive rollers, and belts whereby said drive pulleys operate said driven pulleys, the pairs of drive and driven pulleys operatively connected by said belts being of different ratios so that the drive rollers are progressively driven faster as the rearward end of said apparatus is approached.

3. A combination as presented in claim 2 in which said belt connecting the drive and driven pulleys at the forward end of said apparatus positively drives said driven pulley, and the others of said belts frictionally drive said driven pulleys.

In testimony whereof, I have hereunto set my hand at Los Angeles, California, this 12th day of May, 1927.

HARRY K. FAIRALL.